United States Patent [19]

Cord et al.

[11] Patent Number: 5,426,761
[45] Date of Patent: Jun. 20, 1995

[54] CACHE DASD SEQUENTIAL STAGING AND METHOD

[75] Inventors: Joel H. Cord; Susan K. Candelaria; Joseph S. Hyde, all of Tucson, Ariz.; Larry R. Perry, Gilroy, Calif.

[73] Assignee: International Business Machines Corporation, Armonk, N.Y.

[21] Appl. No.: 995,276

[22] Filed: Dec. 22, 1992

[51] Int. Cl.6 ............... G06F 13/16; G06F 13/00
[52] U.S. Cl. .................................... 395/425
[58] Field of Search ............................ 395/425

[56] References Cited

U.S. PATENT DOCUMENTS 4,603,380  7/1986  Easton et al. ............... 395/425
4,800,483  1/1989  Yamamoto et al. .......... 395/325
4,882,642  11/1989 Tayler et al. ............... 360/78.11
5,253,351  12/1993 Yamamoto et al. .......... 395/425

Primary Examiner—David L. Robertson
Assistant Examiner—Reginald Bragdon
Attorney, Agent, or Firm—Benman Collins & Sawyer

[57] ABSTRACT

A system for prestaging data into a cache to increase the speed data is received from a direct access storage drive (DASD) is utilized within a data processing system. This system utilizes multi-track read operations to prestage tracks into the cache. In so doing, the overhead associated with proceeding from one track to the next is reduced. The system allows for the prestaging of up to a cylinder of tracks per prestage. The prestaging system will also allow internally scheduled operations requiring a physical device to interrupt the prestaging if conditions require this action to maintain subsystem performance.

10 Claims, 5 Drawing Sheets

CACHE DASD SEQUENTIAL STAGING AND METHOD

FIELD OF THE INVENTION

The invention relates to data storage systems for data processing systems and more particularly relates to controller units for disk drives serving a plurality of host mainframe computers.

BACKGROUND OF THE INVENTION

Mainframe computer systems generally use auxiliary storage devices for mass storage of data. In auxiliary storage devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD, pronounced "dasdee") are one type of auxiliary storage device. In a direct access storage device access time to data is independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A track is a 360° rotation for a given disk. A cylinder is a vertical band of tracks. There are typically 15 tracks in a cylinder. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage controller is logically positioned between the DASDs and the host computers. The storage controller handles connection and disconnection between a particular computer and magnetic disk unit for transfer of data.

The IBM 3990 storage controller is an example of a storage controller used to control connections between magnetic disk units and host computers. The IBM 3990 Model 3 type controller, which is available from IBM Corporation, can handle up to sixteen channels from host computers and up to sixty-four magnetic storage units. Within the storage controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an 8×2 switch.

Channels are physical links between the storage controller and the host computers. Usually, a host computer has two or four channels, half being physically connected to the one multipath storage director and the other half being connected to the other multipath storage director. Each storage path is connected to all of the available magnetic disk units. Upon indication that a disk is ready, the controller can secure any one of a plurality of the channels, and storage paths back to a host to establish a data path. It is a feature of the IBM 3990 storage controller that an input/output transaction between a host computer and a magnetic disk unit may be broken into two separate connections, which may be handled along distinct channels and storage paths. A request need not be responded to over the same channel on which it was received. This feature increases throughput through the storage controller, because during the disconnect period the storage controller handles other tasks, such as a connection for another computer with another DASD.

While each path is in effect a stand alone control unit based upon its own microprocessor, the storage paths share control information through a common memory space for synchronization functions relating to handling connections, disconnections and reconnections relating to a transaction. Each storage path in a storage control unit has access to three addressable memory devices used for supporting storage control unit operation. The three memory devices are: a shared control array (SCA); a cache; and non-volatile storage. This patent deals primarily with exploitation of prestaging DASD tracks into the cache to increase the speed of the data retrieval.

Cache is best known for its application as an adjunct to computer memory, where cache is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. The contents of cache are duplicated in system memory.

Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to come to the appropriate position and the limited bandwidth of the magnetic transducers used to read and write the data. By duplicating frequently accessed data in cache, read time for data is reduced and data storage system throughput is considerably enhanced. High speed components are expensive in terms of cost per byte of storage, particularly when compared with magnetic media storage and thus cache is quite small compared to the memory device for which it acts as a buffer.

In the IBM 3990 Model storage controller, storage controller cache has been used to provide a buffering function for some data being written to a DASD device. In the IBM 3990 Model storage controller, data is conventionally stored in the storage controller cache as track images.

Non-volatile storage (NVS) was added to the storage controller as a backup to cache for its buffering function. Non-volatile storage can be provided by special memory circuits or by memory that has a back up power source. Access to NVS is faster than access to a direct access storage device, but generally slower than cache. Data are branched to cache, for speed in transfer to the DASD, and to NVS to back up the cache in case of power failure. Data written to NVS are considered as safe as if written to magnetic media, and indication may be given to the host computer that the data are successfully stored.

To increase the speed of data retrieval from DASD the storage control unit may prestage tracks into the cache for sequentially organized data sets or files. The prestaging of tracks into cache is triggered by channel programs whose define extent channel command word indicates sequential processing will take place. In the context of the present application, what is meant by prestaging is reading one or more tracks into cache before processing channel programs arrive for those tracks.

In prior art systems, a fixed number of tracks were prestaged, typically two. One of the problems with prestaging a small number of fixed prestages is that the channel programs could easily exhaust this small buffer of prestaged tracks. Typically, the prestage is scheduled at the end of a channel program. Accordingly, if processing track 0, tracks 1 and 2 are scheduled for prestaging. If processing track 1, tracks 2 and 3 are scheduled prestaging. In this arrangement, often times one of the tracks being prestaged is already in the cache. Accordingly, there is significant overhead associated with prestaging only one track.

In addition, in this type of fixed track prestaging is used in which a single track is rolled into the cache. There is usually a long latency when the second track is accessed. Therefore, in the fixed prestaging algorithm there are inefficiencies. One inefficiency is due to latency associated with the single track roll mode. The second inefficiency is due to overhead to issue the internal prestaging and access to the cache if more than three tracks were accessed by the channel program. Accordingly, the small number of tracks prestaged can be easily exhausted by the channel programs and there is significant overhead associated with the single track roll mode.

The present invention overcomes the above-mentioned problems.

SUMMARY OF THE INVENTION

The present invention is a system for accessing data in a DASD cache which provides significantly improved performance over previously known systems for accessing records within the cache. The present invention prestages a variable number of tracks within a cache. The present invention, thereby, substantially reduces the overhead issues related to static prestaging processes. Finally, the present invention also can prestage up to a cylinder of tracks per stage compared to a fixed number of tracks such as two (2) as disclosed in the prior art. This system will prestage a plurality of tracks, in one embodiment three (3), and dependent upon other conditions within the system will prestage up to a cylinder of tracks within the cache.

After the initial group of tracks are prestaged, the system will interrupt the prestaging if specified requests are queued for the device during the prestage. It will also interrupt prestaging if enough requests are queued for other physical devices.

In so doing, operations to be accomplished by the subsystems are not interrupted and the prestaging of other tracks does not act as a block to accesses by the host or signal processor within the system. In addition, through this system more tracks can be prestaged before any access occurs which results in a significant performance gain relative to prior art static prestaging systems.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein.

DETAILED DESCRIPTION OF THE INVENTION

Figure 1:
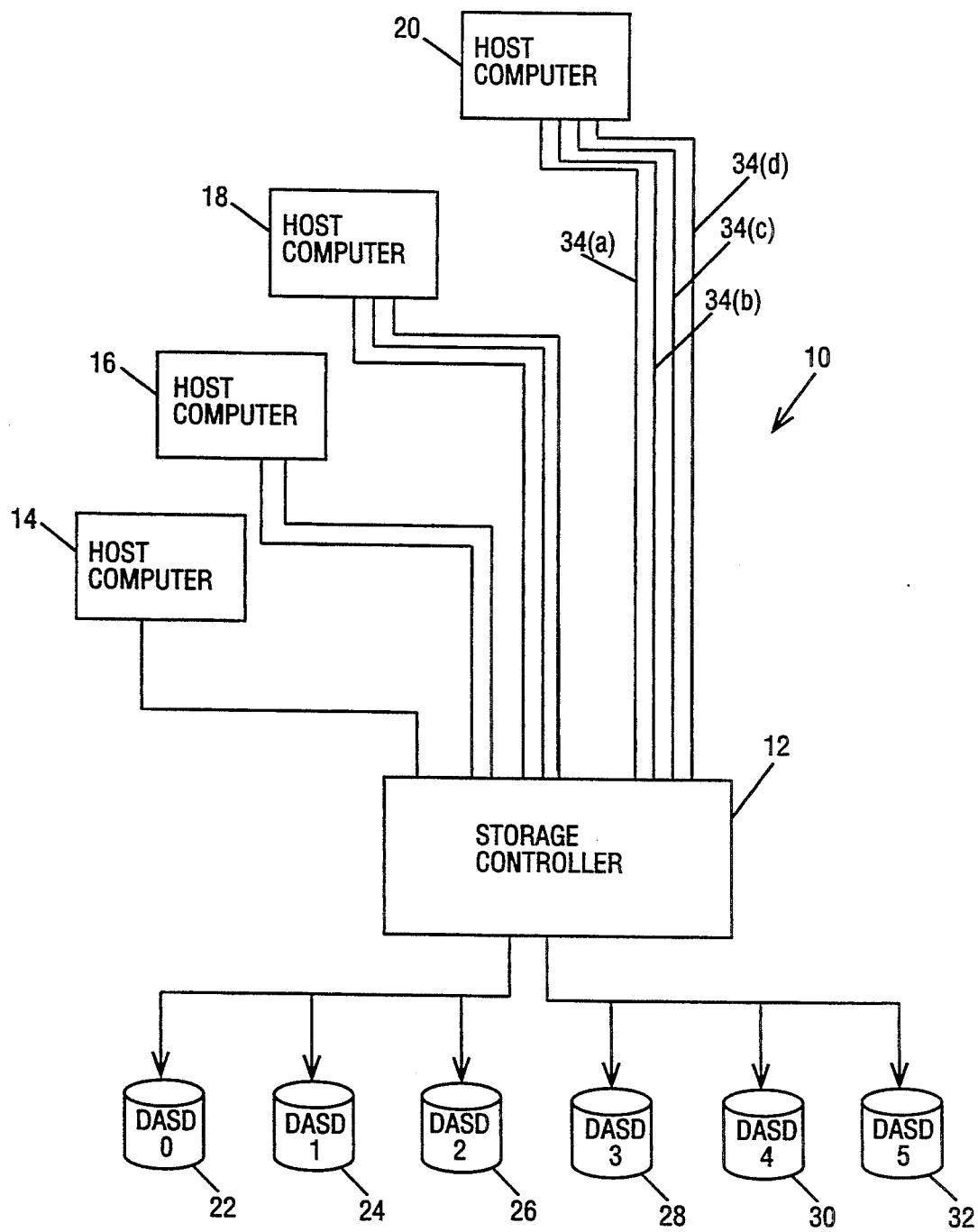
FIG. 1 is a block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, such as disk drives. Storage units 22–32 are also connected to storage controller 12 for selective connection for communication with host computers. Storage controller 12 is preferably an IBM 3990 Model 3 type controller, which is available from IBM Corporation.

Host computers 14–20 are typically mainframe systems such as the IBM 3090, the ES9000 Model computer, or comparable systems. Host computers 14–20 are connected to storage controller 12 with at least one and up to four channels. For example, host computer 20 is connected to storage controller 12 by channels 34(a), 34(b), 34(c), and 34(d). The channels come in two types, parallel data channels and serial data channels. Certain optical serial channels are used for data transmission up to 15 kilometers. Parallel channels utilize electrical signals and are generally not used at distances of greater than about 125 meters.

Figure 2:
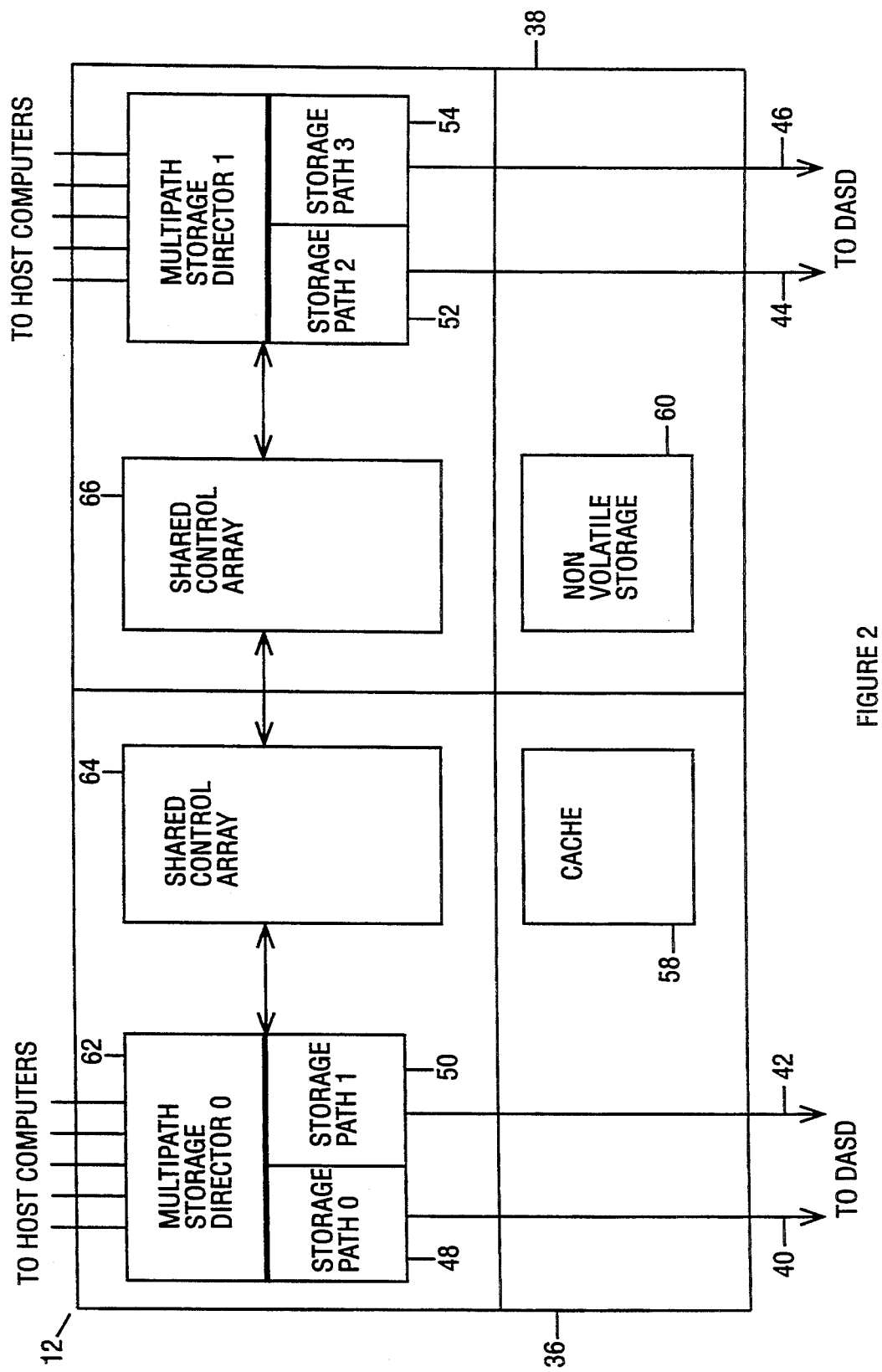
FIG. 2 is a block diagram of a storage controller from the data processing system of FIG. 1.

FIG. 2 depicts storage controller 12 in greater detail. Storage controller 12 has two storage clusters 36 and 38, each of which provides for selective connection between a host computer and a direct access storage device. Although four host computer systems and six direct access storage devices are depicted in FIG. 1, storage controller 12 can handle additional channels and direct access storage devices.

Data from a given host computer system may be stored to any of the direct access storage devices for a given host computer. Where a host computer is connected by at least two channels, one each is connected to storage clusters 36 and 38. Similarly, where four channels are provided, two are connected to storage cluster 36 and two to the second to storage cluster 38. Storage controller 12 may receive a request from a host computer over a channel, and respond to the request over any one of the channels connected to the same host computer. The channels associated with one host computer are known as a path group. Storage controller 12 has knowledge of the path groups, having received it from each host computer.

Storage controller 12 has four paths 40, 42, 44 and 46 to the direct access storage devices. Each data path 40–46 is associated with one of storage path processors 48–54, respectively. Each data path goes to all of the direct access storage devices. Only one data path has access to a direct access storage device at a time, however. Because storage controller 12 attempts to synchronize disconnects and reconnects between direct access storage devices and host computers based upon rotational position of a disk in the direct access storage device, storage controller 12 may be seen to operate, in essence, as a data transfer manager. An objective of the traffic management scheme is to respond to requests received over the channels to the host computers as quickly as possible. One way to meet this objective is to keep the storage path processors occupied with data moving between host computers and direct access storage devices.

Storage controller 12 is internally divided into sections corresponding to independent power supplies. Two sections are storage clusters 36 and 38, respectively. A third section includes a memory cache 58. A fourth section includes a non-volatile storage 60. Cache 58 provides storage for frequently accessed data and for the buffering functions of the method of the present invention. Non-volatile storage 60 is used for temporary storage of data being written to a storage device in order to provide similar response times for cache writes and cache reads. Storage of data in non-volatile storage under such circumstances allows indication to a host that the storage operations is logically complete, notwithstanding the fact that actual transfer of the data to a direct access storage device has not yet been completed.

Storage clusters 36 and 38 mirror one another in terms of functional features. Accordingly, only storage cluster 36 is described here. Storage cluster 36 includes a multipath storage director 62 which operates as a four or eight by two switch between the channels from the host computer systems and signal path processors 48 and 50. Storage cluster 36 also includes a shared control array 64, which duplicates the contents of shared control array 66 in storage cluster 38. Shared control arrays 64 and 66 store path group information as well as control blocks for the direct access storage devices. The shared control arrays may also be used for storage of some of the data structures utilized in controlling cache 58 and in practicing the method of the present invention, as described below. Data structures can also be stored in cache 58.

Figure 3:
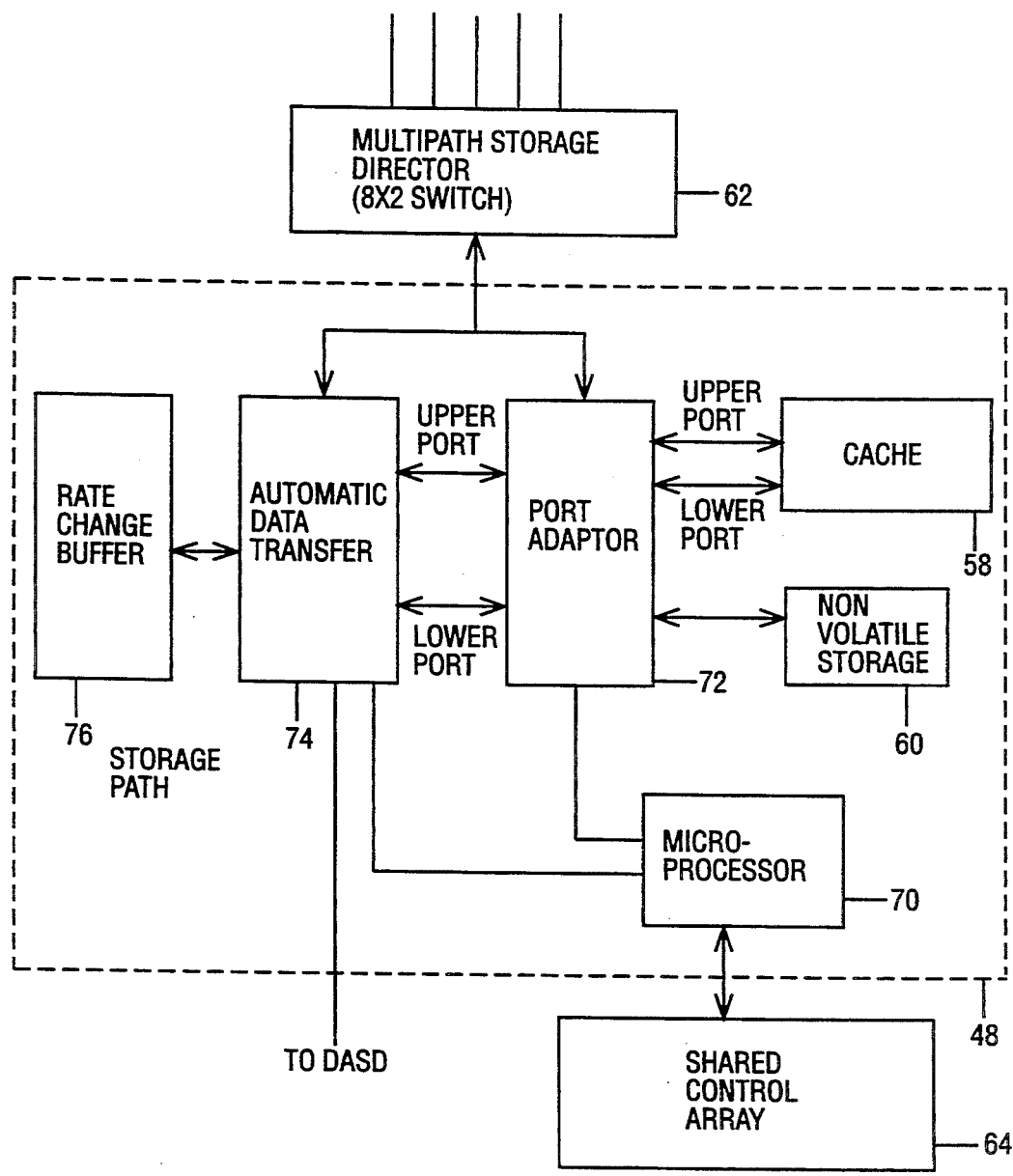
FIG. 3 is a block diagram of a storage path processor.

FIG. 3 illustrates storage path processor 48 in a block diagram schematic. Storage path processor 48 is connected out to multipath storage director 62 by an upper port and to a plurality of direct access storage devices by a lower port. Data transfer between the multipath storage director 62 and one of direct access storage devices during synchronous operations occurs via an automatic data transfer circuit 74 supported by a rate change buffer 76, if required. Rate change buffer 76 compensates for differences between the speed of data transference by disk drive type direct access storage devices and the operating speed of the channels to host computers. The channels typically handle data at a faster rate than the direct access storage devices.

A port adaptor 72 controls transfer of data between cache 58, non-volatile storage 60 and the lower port. Port adapter 72 also controls transfer of data between cache 58 and the upper port. As discussed above, the presence of cache 58 and non-volatile storage 60 provide for logical completion of certain data transfers without waiting for physical synchronization of disk and channel connection. All operations of storage path processor 48 are under control of a microcomputer 70. Before data transfer can begin, the DASD control must be oriented. It does that by detecting either the index point or the start-of-count area other than record zero. Once the count area, or index, has been detected, the device control can work its way down the track to perform the operations commanded by the channel program. After validating the locate record parameters, the control unit directs the device to seek to a first-specified track, positions the device to the designated sector, and begins a search operation to further position itself to a particular record area on the track.

A language of channel command words is known in the art for the construction of channel command word programs using Extended Count Key Data Architecture (ECKD). The ECKD language is used by host computers in communicating with a storage controller to tell the storage controller what data a host computer process requires and where to find the data. ECKD provides a channel command which has a Global Attribute Byte and a Defined Extent (DX) Global Attributes Extended Byte for use with write and read commands of a channel program. The preferred embodiment uses the "sequential access mode" and the "extended sequential access mode" as a trigger for the prestage process.

In such a system it is often important to prestage or provide tracks to be accessed sequentially based upon the previously accessed tracks. Prestaging is important because the processing speed of the subsystems and channels can be very high and if prestaging did not occur the system would be idle a significant amount of time. It should be understood in this type of system, an algorithm typically is utilized within the storage processors to prestage the subsequent tracks and this algorithm interprets certain commands that appear in a channel program or the like from the host system.

Prior art systems, disclosed static prestaging within a DASD cache, that is a fixed number of tracks are prestaged. Although these systems do improve efficiency of the computer in accessing tracks of data within the cache to some extent, prestaging a fixed number of tracks is inefficient when maintaining maximum performance.

The present invention overcomes the above-mentioned problems associated with prior art systems by utilizing a multitrack (MT) prestaging system. This system eliminates the extra overhead when proceeding from one track to the next. It also prestages up to a cylinder of tracks unlike the prior art system. In a typical cache based system there may be up to fifteen tracks per cylinder.

Figure 4:
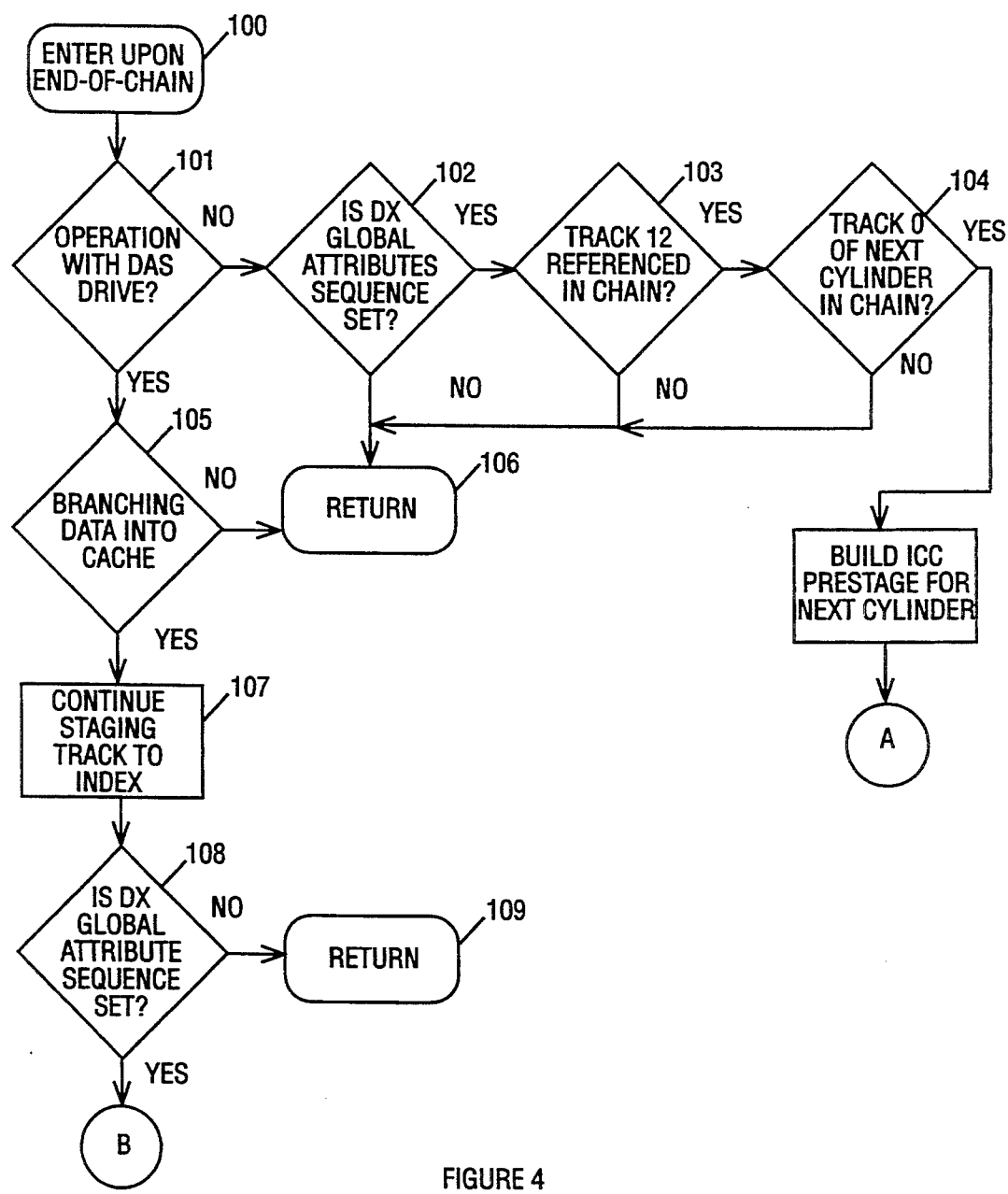
FIG. 4 is a block diagram of a flow chart of setting up the system for prestaging in accordance with the present invention.

FIG. 4 is a logical flow chart illustrating the setting up of the sequential prestaging process in accordance with the present invention. In this system for illustrative purposes there are typically 15 tracks per cylinder. It should be understood that there can be any number of tracks per cylinder to use the present invention.

Step 100 illustrates the execution upon the end of channel program and chain are equivalent in this discussion. Thereafter, after the end of chain, step 101 is executed to determine if the chain was operating with the DAS device. The no branch is a cache hit scenario which will be discussed later in this description. The yes branch is the cache miss scenario. Step 105 is executed to determine if data is being branched into the cache. If data is not being branched into cache, then return via step 106. If data is being branched into the cache, then the staging of data continues until the end of track (index point). Step 108 is then executed to determine whether the sequential access mode is set in the Define Extent data bytes. In other words, is this a sequential channel program; if the answer is no, then return, via step 109. If the answer is yes then prestaging can begin via connector B.

Now turning to the cache hit scenario, if the chain was not operating with DASD at step 101, then step 102 is executed to determine whether the sequential access mode set in the Define Extent data bytes. If the answer is no, then return, via step 106. If the answer is yes, execution proceeds to step 103 where it is determined whether track 12 in the referenced cylinder has been accessed. If track 12 has not been referenced, then return, via step 106. If track 12 has been referenced, then step 104 is executed. In step 104 it is determined whether track 0 of the next cylinder is in the extent range provided by the Define Extent command. If the answer is no, then return; but if the answer is yes, then the internal command chain (ICC) to prestage the next cylinder is built and the ICC is scheduled.

Accordingly, FIG. 4 shows the setting up of the sequential multitrack prestage routine.

Figure 5:
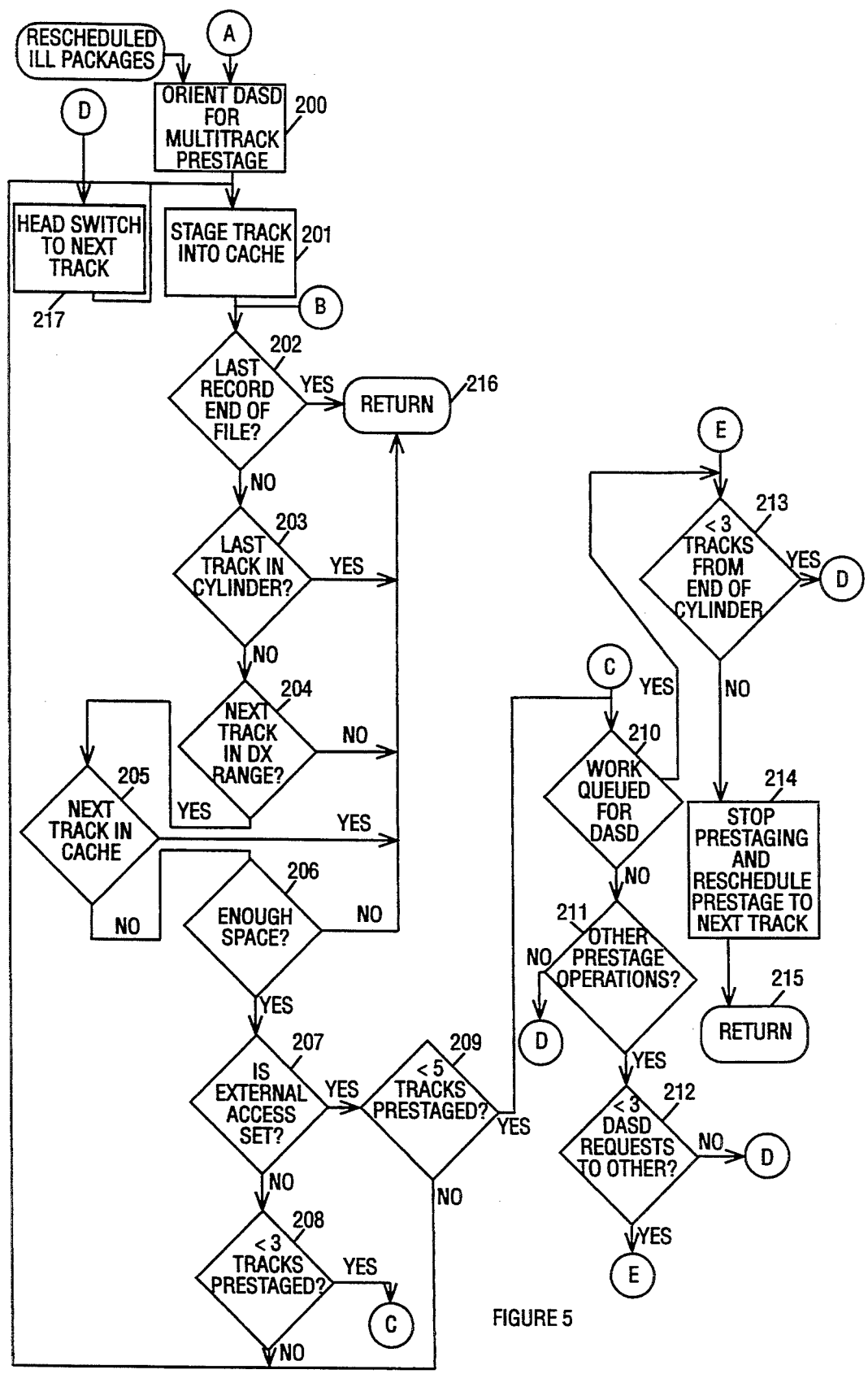
FIG. 5 is a flow chart showing the prestaging system in accordance with the present invention.

FIG. 5 is a flow chart that illustrates the sequential prestaging routine in accordance with the present invention. Execution flow enters at step 200 either because of a rescheduled prestage operation or via connector A, the cache hit scenario, to perform a new prestage of the tracks of the next cylinder. At step 200, the DASD is oriented for the multitrack prestage. Essentially, the DASD is oriented to be at the beginning of the track. Thereafter, in step 201, the current track is staged into the cache. Execution then proceeds to step 202 which can also be entered via connector B, the cache miss scenario. The cache miss scenario allows for the DASD staging operation to continue without loss of orientation or excess DASD rotations.

Step 202 is then executed to determine if the last record staged on the track was an end of file record. What is meant by end of file record in the context of this application is that the key length and the data length in a count field are both zero. If it is an end of file record, then return, via step 216. If it is not, then step 203 is executed to determine if the staged track is the last track in the cylinder. If it is the last stage, then return, via step 216. If it is not, then step 204 is executed to determine if the next track in the cylinder is in the extent range provided in the DX data bytes.

If the answer is no, then return, via step 216. If the answer is yes, then determine if the next track is already in the cache, via step 205. If the track is already in the cache, then return, via step 216. If it is not, then step 206 is executed. Step 206 determines whether there is enough space in the cache to store the next track to prestage. If there is not enough space in the cache, then return, via step 216. If there is enough space, step 207 is executed.

Step 207 determines whether the extended sequential access mode is set in the Define Extent data bytes. This step determines whether a minimum of 3 tracks or 5 tracks are to be prestaged before the prestage process can be interrupted. If the answer is no, an attempt is made to prestage three tracks. If the answer is yes, an attempt is made to prestage 5 tracks.

Step 208 determines whether 3 or more tracks have been prestaged in the current prestage operation. If the answer is no, then go to step 217 and perform a head switch to the next track. Processing proceeds to step 201 where this track is staged into the cache. If at step 208 the answer is yes, then execute step 210 (via connector C). Step 209 determines whether 5 or more tracks have been prestaged in the current prestage operation. If the answer is no, go to step 217 and perform a head switch to the next track. Processing proceeds to step 201 where this track is staged into the cache. If the answer is yes, then execute step 210.

Steps 210, 211, 212 and 214 are to prevent the sequential prestage operation from overutilizing the DASD or storage path when other work is pending. Step 210 determines whether work is queued for the DASD currently performing the prestage. If the answer is yes, then go to step 213 which will be described later. If the answer is no, then step 211 is executed. Step 211 determines whether there are 2 or more prestage operations in progress. If there are not two or more prestage operations in progress, go to step 217 via connector D so that the next track can be staged into the cache. If the answer is yes, then execute step 212.

Step 212 determines whether greater than 3 DASD requests are queued to other physical devices. If the answer is yes, then go to step 213 via connector E. If the answer is no, then proceed to step 217 via connector D so that the next track can be staged into the cache. Step 213 determines whether the prestage operation is less than 3 tracks from the end of the cylinder. If the answer is yes, then continue staging data into the cache by going to step 217 via connector D. If the answer is no, then proceed to step 214 to interrupt the prestaging processing and reschedule the ICC prestage starting with the next track. Then execute a return, via step 215.

The present invention is an improvement over prior art prestaging systems due to the tracks being prestaged dynamically in groups of n size in this case, 3 to 15, compared to the fixed number of tracks (2) prestaged in prior art systems. By having longer prestages cycles in terms of number of tracks per prestage there is also an increase of efficiency of the process. Hence, more data is prestaged in less time where time includes the setting up of the processes. In addition, a corollary to the above observation is that the system interface is tied up for less time for a given number of tracks prestaged. Finally, this system is adaptive. It will allow channel I/O or internal requests to the physical devices to interrupt the prestaging if conditions require this action to improve subsystem performance.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

We claim:

1. In a data processing system that includes a plurality of host processors, a storage controller containing a cache, the cache including a plurality of tracks, the storage controller being coupled to the plurality of host processors, and a plurality of direct access storage devices (DASDs) also coupled to the storage controller, a method for prestaging of the plurality of tracks into the cache from one of the plurality of DASDs comprising the steps of:

(a) determining if a sequential access of tracks from one of the plurality of DASDs is to be executed;
   (b) staging a track into the cache if sequential access is to be executed;
   (c) determining if the staged track is a last record to be read, if the staged track is the last record to be read, then return to step (a);
   (d) determining if the staged track is a last track in a cylinder of the one of the plurality of DASDs if the track is not the last record to be read, if the track is the last track in a cylinder of the one of the plurality of DASDs then return to step (a);
   (e) determining if a next track to be staged is in a Define Extent range of data bytes if the staged track is not the last track in the cache, if the next track to be staged is not in the Define Extent range then return to step (a);
   (f) determining if the next track to be staged is already in the cache if the next track to be staged is in the Define Extent range, if the next track to be staged is already in the cache then return to step (a);
   (g) determining if there is enough space in the cache if the next track to be staged is not already in the cache;
   (h) determining whether an access mode is set, if the access mode is set a first predetermined number of tracks are to be prestaged, if the access mode is not set a second predetermined number of tracks are to be prestaged;
   (i) determining responsive to the access mode being set whether the first predetermined number of tracks has been reached, if the first predetermined number of tracks has not been reached then proceed to step (a), if the first predetermined number of tracks has been reached then proceed to step (k);
   (j) determining responsive to the access mode not being set whether the second predetermined number of tracks has been reached, if the second predetermined number of tracks has not been reached then proceed to step (a), if the first predetermined number of tracks has been reached then proceed to step (k);
   (k) determining if there are other specified activities in the data processing system if one of the first and second predetermined number of tracks have been prestaged, step (k) comprising the steps of:

(k1) determining, whether other work is queued for the one of the plurality of DASDs;
   (k2) determining whether two prestage operations or more are in progress if other work is not queued for the one of the plurality of DASDs;
   (k3) determining whether at least three DASD requests are queued to other physical devices if there are not two or more prestage operations in progress;
   (k4) determining whether there is less than three tracks to the end of the cylinder of the one of the plurality of DASDs if there are not three DASD requests queued to other physical devices; and (l) interrupting the prestaging of the plurality of tracks if the answers to steps (k1), (k2), and (k3) are yes and step (k4) is no.

2. The method of claim 1 in which the second predetermined number of tracks is three.

3. The method of claim 1 in which the first predetermined number of tracks is five.

4. The method of claim 1 in which the number of tracks in a cylinder is fifteen.

5. In a data processing system that includes a plurality of host processors, a storage controller containing a cache, the cache including a plurality of tracks, the storage controller being coupled to the plurality of host processors, and a plurality of direct access storage devices (DASDs) also coupled to the storage controller, a system for prestaging of the plurality of tracks into the cache from one of the plurality of DASDs comprising:

means for determining if a sequential access of tracks from one of the plurality of DASDs is to be executed;

means for staging a track into the cache responsive to the sequential access determining means;

means, responsive to the track staging means, for determining if the staged track is a last track to be read;

means, responsive to the last track determining means, for determining if the staged track is a last track in a cylinder of the one of the plurality of DASDs if the track is not a last track to be read;

means, responsive to the last track determining means, for determining if a next track to be staged is in a Define Extent range of data bytes if the staged track is not the last track in the cylinder of the one of the plurality of DASDs;

means, responsive to the next track determining means, for determining if the next track to be staged is already in the cache if the next track to be staged is in the Define Extent range;

means, responsive to the next track in cache means, for determining if there is enough space in the cache if the next track to be staged is not already in the cache;

means, responsive to the cache space determining means, for determining whether an access mode is set, if the access mode is set a first predetermined number of tracks are to be prestaged, if the access mode is not set a second predetermined number of tracks are to be prestaged;

means, responsive to the access mode being set, for determining whether the first predetermined number of tracks has been reached;

means, responsive to the access mode not being set, for determining whether the second predetermined number of tracks has been reached;

means, responsive to one of the first and second predetermined number of tracks being reached, for determining if there are other specified activities being performed, the other specified activities determining means further comprises:

means for determining whether other work is queued for the one of the plurality of DASDs;

means, responsive to the other work determining means, for determining whether two prestage operations or more are in progress;

means, responsive to the prestage operations determining means, for determining whether at least three DASD requests are queued to other physical devices;

means, responsive to the DASD requests determining means, for determining whether there are less than three tracks to the end of a cylinder; and means for interrupting the prestaging operation responsive to the other work determining means, the prestaging operations determining means, the DASD requests determining means and the end of cylinder determining means.

6. The system of claim 5 in which the second predetermined number of tracks is three.

7. The system of claim 5 in which the first predetermined number of tracks is five.

8. The system of claim 5 in which the number of tracks in a cylinder is fifteen.

9. In a data processing system that includes a plurality of host processors, a storage controller containing a cache, the cache including a plurality of tracks, the storage controller being coupled to the plurality of host processors, and a plurality of direct access storage devices (DASDs) also coupled to the storage controller, a method for prestaging of the plurality of tracks into the cache from one of the plurality of DASDs comprising the steps of:

(a) determining if a sequential access of the plurality of tracks is to be executed;

(b) staging a track into the cache if sequential access is to be executed;

(c) determining if the staged track is a last record to be read, if the staged track is the last record to be read, then return to step (a);

(d) determining if the staged track is a last track in a cylinder of the one of the plurality of DASDs if the track is not the last record to be read, if the track is the last track in a cylinder of the one of the plurality of DASDs then return to step (a);

(e) determining if a next track to be staged is in a Define Extent range of data bytes if the staged track is not the last track in a cylinder of the one of the plurality of DASDs, if the next track to be staged is not in the Define Extent range then return to step (a);

(f) determining if the next track to be staged is already in the cache if the next track to be staged is in the Define Extent range, if the next track to be staged is already in the cache then return to step (a);

(g) determining if there is enough space in the cache if the next track to be staged is not already in the cache;

(h) determining whether a predetermined number of tracks has been reached, if the predetermined number of tracks has not been reached then proceed to step (a), if the predetermined number has been reached then proceed to step (i);

(i) determining if there are other specified activities in the data processing system if the predetermined number of tracks have been prestaged, the other specified activities determining step (i) further comprises the steps of:

(i1) determining whether other work is queued for the one of the plurality of DASDs;

(i2) determining whether a first predetermined number of prestage operations are in progress if the other work is not queued for the one of the plurality of DASDs;

(i3) determining whether a second predetermined number of DASD requests are queued to other physical devices if the first predetermined number of prestage operations are not in progress;

(i4) determining whether there is less than a third predetermined number of tracks to the end of the cylinder if there are not the second predetermined number of DASD requests queued to other physical devices; and (1) interrupting the prestaging of a plurality of tracks if the answers to steps (i1), (i2), and (i3) are yes and step (i4) is no.

10. In a data processing system that includes a plurality of host processors, a storage controller containing a cache, the cache including a plurality of tracks, the storage controller being coupled to the plurality of host processors, and a plurality of direct access storage devices (DASDs) also coupled to the storage controller, a system for prestaging of the plurality of tracks into the cache from one of the plurality of DASDs comprising the steps of:

means for determining if a sequential access of the plurality of tracks is to be executed;

means for staging a track into the cache responsive to the sequential access determining means;

means, responsive to the track stage means, for determining if the staged track is a last record to be read;

means, responsive to the last record determining means, for determining if the staged track is a last track in a cylinder of the one of the plurality of DASDs if the track is not the last record to be read;

means, responsive to the last track determining means, for determining if a next track to be staged is in a Define Extent range of data bytes if the staged track is not the last track in the cylinder of the one of the plurality of DASDs;

means, responsive to the next track to be staged determining means, for determining if the next track to be staged is already in the cache if the next track to be staged is in the Define Extent range;

means, responsive to the next track in cache means, for determining if there is enough space in the cache if the next track to be staged is not already in the cache;

means, responsive to the enough space in cache determining means, for determining whether a predetermined number of tracks has been reached;

means, responsive to the predetermined number of tracks being reached, for determining if there are other specified activities being performed, the other specified activities being performed determining means further comprises:

means for determining whether other work is queued for the one of the plurality of DASDs;

means, responsive to the other work determining means, for determining whether a first predetermined number of prestage operations are in progress;

means, responsive to the prestage operations determining means, for determining whether a second predetermined number of DASD requests are queued to other physical devices;

means, responsive to the DASD requests determining means, for determining whether there is less than a third predetermined number of tracks to the end of a cylinder; and means for interrupting the prestaging of a plurality of tracks responsive to the other work determining means, the prestaging operations determining means, the DASD requests determining means and the end of cylinder determining means.

* * * * *